United States Patent [19]

Takata et al.

[11] 4,377,224
[45] Mar. 22, 1983

[54] CLUTCH BRAKE ASSEMBLY

[75] Inventors: Terasu Takata; Makoto Hangai; Yasuo Yokoyama, all of Kiryu, Japan

[73] Assignee: Ogura Clutch Co., Ltd., Kiryu, Japan

[21] Appl. No.: 188,950

[22] Filed: Sep. 19, 1980

[30] Foreign Application Priority Data

Oct. 11, 1979 [JP] Japan .............................. 54-131227

[51] Int. Cl.³ .......................................... F16D 41/24
[52] U.S. Cl. ................................................ 192/18 R
[58] Field of Search ................ 192/18 R, 18 A, 18 B, 192/12 R

[56] References Cited

U.S. PATENT DOCUMENTS

| 2,812,047 | 11/1957 | Smitzer | 192/18 R |
| 3,691,859 | 9/1972 | Peters | 192/18 R |
| 3,893,191 | 7/1975 | Gold et al. | 192/18 B |
| 4,205,509 | 6/1980 | Miyazawa et al. | 192/18 R |
| 4,286,701 | 9/1981 | MacDonald | 192/18 R |

*Primary Examiner*—George H. Krizmanich
*Attorney, Agent, or Firm*—Frishauf, Holtz, Goodman and Woodward

[57] ABSTRACT

An axially displaceable brake element is arranged in facing relation to an operating element which is pivotable through a predetermined circumferential angle, with clutch balls engaged in grooves having slanted bottoms and formed in mutually facing side surfaces of the brake element and the operating element. Pivoting of the operating element causes displacement of the brake element relative to the operating element. A friction plate is spline-fitted on an output hub so as to be displaced only in the axial directions and arranged selectively for frictional contact with the brake element or the operating element. Displacement of the brake element toward the operating element causes frictional engagement of the friction plate with an input hub to obtain engagement of the clutch, while displacement of the brake element away from the operating element causes frictional engagement of the friction plate with the brake element to obtain disengagement of the clutch and braking of the output hub.

7 Claims, 5 Drawing Figures

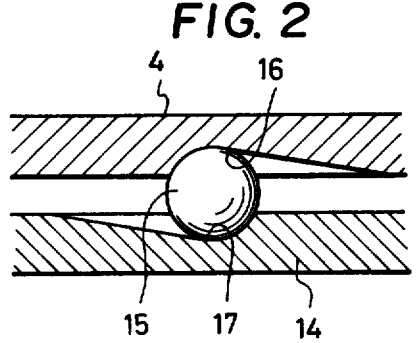
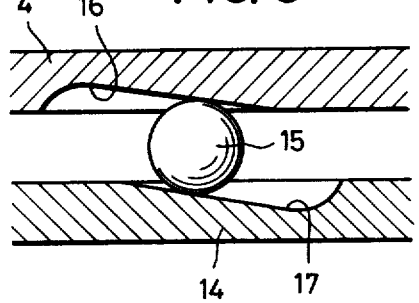
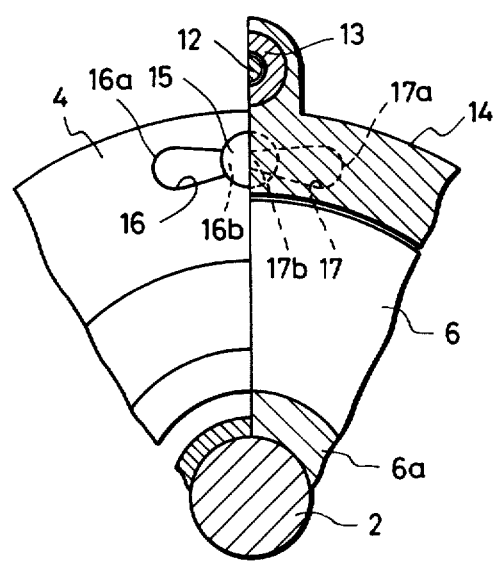

CLUTCH BRAKE ASSEMBLY

BACKGROUND OF THE INVENTION

This invention relates to a clutch brake assembly for transmitting torque produced by a rotary machine serving as a driver such as a stepping motor to the rotary part of a driven machine to drive the latter, and more particularly to a clutch brake assembly which is capable of stopping the rotation of the rotary part of the driven machine instantly upon interruption of the torque transmission.

Clutch brake devices in general include a type which is disclosed e.g. in U.S. Pat. No. 3,893,191 and which has a first friction element provided on the clutch side and a second friction element provided on the brake side, wherein the first friction element acts to cause torque transmission and the second friction element acts as a brake when the torque transmission action is interrupted, or a type which is disclosed e.g. in U.S. Pat. No. 3,233,709 and which further includes a friction plate interposed between a friction element on the clutch side and another friction element on the brake side, wherein the friction plate has one side surface arranged for frictional engagement with the clutch-side friction element and the other side surface for frictional engagement with the brake-side friction element, thus to perform torque transmission action and braking upon interruption of the torque transmission action.

However, the above-mentioned conventional types both have difficulties in reducting the axial lengths of the whole clutch brake assemblies and therefore the conventional devices of these types virtually suffer rather large axial lengths.

This large axial length of these conventional clutch brake assemblies also has an unfavorable influence upon machines in which the assemblies are installed, such as electronic computers and peripheral equipment connected thereto, providing difficulties in compacting these machines.

OBJECTS AND SUMMARY OF THE INVENTION

It is therefore an object of the invention to provide a clutch brake assembly which has a largely reduced axial length as a whole, is capable of performing clutch and brake actions in a positive manner, and can be manufactured at low costs.

According to the present invention, a clutch brake assembly is provided which comprises: an annular operating element externally operatable for pivotal movement through a predetermined circumferential angle; a cylindrical input hub arranged concentrically of said operating element and rigidly fitted on an output shaft of a rotary machine as a driver; an output hub having an axially extending boss portion and arranged concentrically of said output shaft for rotation relative to said output shaft; an annular friction plate spline-fitted on said boss portion of said output hub for pivotal movement in unison with said output hub and for axial displacement relative to said output hub for frictional engagement with said input hub; urging means resiliently urging said friction plate toward said input hub; an annular brake element interposed between said operating element and said friction plate and axially displaceable for frictional engagement with said friction plate; means permitting axial displacement of said brake element and prohibiting circumferential displacement of same; and a plurality of balls rollingly held between said operating element and said brake element.

The operating element includes a plurality of first grooves formed in a side surface thereof facing the brake element at circumferentially spaced locations. The brake element in turn includes a plurality of second grooves formed in a side surface thereof facing the operating element at circumferentially spaced locations. These first and second grooves extend circumferentially, respectively, of the operating element and the brake element. At least one of the first and second grooves each have a depth gradually decreasing from one end thereof toward the other end thereof. The balls are each engaged in mutually facing ones of the first and second grooves.

With the above-mentioned arrangement, axial displacement of the brake element in a direction toward the operating element causes frictional contact of the input hub with the friction plate to thereby permit transmission of torque from the input hub to the output hub, and axial displacement of the brake element in a direction away from the operating element causes disengagement of the friction plate from the input hub to thereby interrupt the torque transmission and simultaneously causes frictional engagement of the brake element with the friction plate to thereby cause braking of the output hub.

These and other objects will become apparent from the following detailed description.

BRIEF DESCRIPTION OF THE DRAWINGS

FIG. 2 is a horizontal sectional view showing on an enlarged scale the relative positions of the clutch ball-operating disc and the annular brake plate of FIG. 1;

FIG. 3 is a sectional view similar to FIG. 2, showing the relative positions of the clutch ball-operating disc and the annular brake plate of FIG. 1, which are different from those shown in FIG. 2;

FIG. 4 is a sectional front view taken on line X—X of FIG. 1; and

DETAILED DESCRIPTION

Preferred embodiments of the invention will be described with reference to the accompanying drawings.

Figure 1:
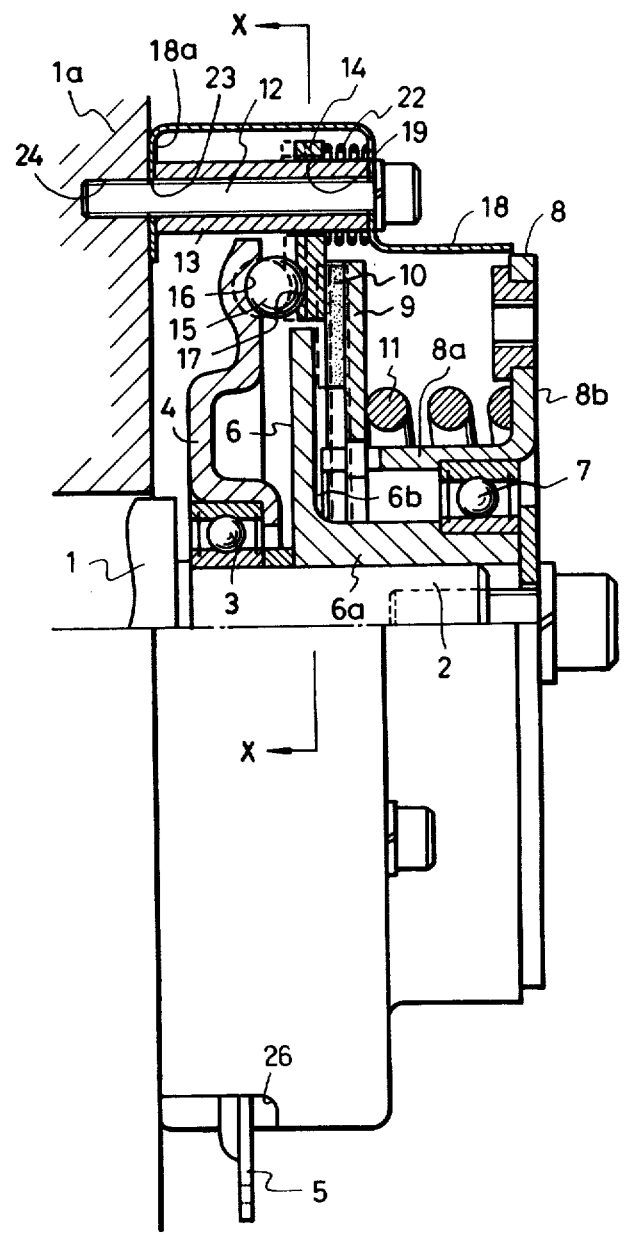
FIG. 1 is a side view showing a clutch brake assembly according to one embodiment of the invention, with half part thereof shown in longitudinal vertical section.

FIGS. 1–4 illustrate a clutch brake assembly according to one embodiment of the invention, in which FIG. 1 illustrates the whole construction of the assembly with upper half part thereof shown in longitudinal vertical section. As shown in FIG. 1, an operating disc 4, which has a substantially annular shape (see FIG. 4) is concentrically supported via a ball bearing 3 on an output shaft 2 of a rotary machine 1 which is a driver such as a stepping motor. The operating disc 4 is arranged for rotational movement about the output shaft 2 through a predetermined small circumferential angle. An operating lever 5 is provided on the disc 4 in a manner radially outwardly projecting from a peripheral portion thereof. This lever 5 extends to the outside through an opening 26 formed in the casing 18 of the assembly and can be externally manually operated.

A cylindrical input hub 6 which forms part of the clutch brake device of the invention is rigidly fitted on the output shaft 2 of the driver for rotation together with the output shaft 2. The input hub 6 has a boss portion 6a on which an output hub 8 is rotatably supported via a ball bearing 7 in concentricity with the boss portion 6a. This output hub 8 is adapted to be secured to the rotary part of a driven machine (not shown). The hub 8 has an axially extending boss portion 8a on an inner end of which a radially extending friction plate 9 is spline-fitted for movement of plate 9 axially of the boss portion 8a.

A friction piece 10 is secured on an inner side surface of the friction plate 9 at a radially outer portion thereof, a radially inner half portion of which is arranged in facing relation to the radially flanged portion 6b of the input hub 6. A coil spring 11 is interposed between the radially flanged portion 8b of the output hub 8 to permanently resiliently urge the friction plate 9 to the left as viewed in FIG. 1, to keep it in urging contact with a brake element 14 or the input hub 6. For example, when the right side surface of the brake element 14 is positioned closer to the operating disc 4 than a corresponding side surface of the input hub 6, the friction plate 9 is in urging contact with the radial flange 6b of the input hub 6 to cause engagement of the clutch as shown by the dashed line in FIG. 1.

A brake element 14 in the form of an annular plate is arranged so as to frictionally engage a radially outer half portion of the friction piece 10. More specifically, a plurality of bolts 12 (only one of them is shown) are axially disposed with one end penetrating the casing 18 and the other end secured to the frame 1a of the rotary machine 1, on each one of which bolts a sleeve 13 is fitted. The brake element 14 is fitted on these bolts 12 through bores 19 formed therein so that it can be displaced only in the axial directions of the assembly along the sleeve 13 serving as a guide (that is, rotation of brake element 14 is inhibited). A coil spring 22 is interposed between an inner wall of the casing 18 and the brake member 14 to permanently urge the brake member 14 toward the operating disc 4. The casing 18 has a radially inwardly extending flange 18a disposed in contact with an front surface of the frame 1a of the rotary machine 1. The bolts 12 extend through bores 23 formed in the flange 18a of the casing 18 with their ends threadedly secured in bores 24 formed in the frame 1a.

In this embodiment, the friction piece 10 is mounted on the friction plate 9 to provide frictional engagement between the plate 9 and the input hub 6 or the brake element 14. However, this piece 10 which is separately provided on the plate 9 can be omitted if the friction plate 9 is made of a material having a coefficient of friction substantially equal to that of the friction piece 10.

In the illustrated embodiment, advantageously three pairs of bolts 12 and sleeves 13 are used and arranged circumferentially of the brake element 14 with an offset of 120 degrees between adjacent pairs, but the numbers of the bolts 12 and the sleeves 13 used are not limitative and may be varied in dependence on the design of the assembly.

The brake element 14 and the operating disc 4 are arranged in facing relation to each other with a plurality of clutch balls 15 (only one of them is shown) held therebetween at circumferentially spaced locations.

The clutch balls 15, which can be comprised of usual bearing balls, are each rollingly fitted in one of a plurality of grooves 16 formed in the operating disc 4 as well as in associated one of a plurality of grooves 17 formed in the brake element 14. The grooves 16, 17 are arranged at circumferentially spaced locations in mutually facing side surfaces of the operating disc 4 and the brake member 14, respectively, and extend circumferentially of the operating disc 4 and the brake plate 14. These grooves 16, 17 each have a slanted bottom with a depth gradually decreasing from one end toward the other end. As shown in FIGS. 2 and 3, the bottoms of the grooves 16 and 17 are slanted in opposite directions to each other. Further, as is clear from FIG. 4, the grooves 16, 17 also have widths gradually becoming smaller from the deeper end portions 16a, 17a toward the shallower end portions 16b, 17b.

Below is an explanation of the operation of the clutch brake assembly according to the present invention. The clutch brake assembly can perform two functions, i.e., engagement of the clutch, and disengagement of the clutch and simultaneous braking of the output hub 8, by rotating the operating disc 4 about output shaft 2 through the operating lever 5 to its clockwise extreme position as shown in FIG. 2 and its counterclockwise extreme position as shown in FIG. 3, respectively, as viewed from the right side in FIG. 1. More specifically, when the operating disc 4 is in a position shown in FIGS. 1, 3 and 4 where the disc 4 is rotated to the leftmost position as viewed from the driven machine side, the clutch balls 15 are located at the shallower portions of the grooves 16, 17 as seen in FIG. 3 so that the distance between the side surfaces of the operating disc 4 and brake element 14 facing each other has a maximum value and thus the brake element 14 is displaced in a direction away from the operating disc 4 in the axial direction of the output shaft 2 to urge the friction plate 9 through the friction piece 10 secured thereto to detach the friction piece 10 from the input hub 6. In this position, transmission of torque from the input hub 6 to the output hub 8 via the friction piece 10 and the friction plate 9 is interrupted, while simultaneously the friction plate 9, which is permanently urged by the coil spring 11, is brought into frictional contact with the brake element 14, which is kept from rotating by means of bolts 12, to prevent rotation of the rotary part of the driven machine due to its inertia force, thus performing braking.

On the contrary, when the operating disc 4 is rotated clockwise to its rightmost position as viewed from the right side in FIG. 1, the clutch balls 15 are now positioned at the deepest portions of the grooves 16, 17 as shown in FIG. 2 so that the brake element 14 is displaced leftward in FIG. 1 by the urging force of the coil spring 11 to bring its side surface facing the friction plate 9 to a location closer to the operating disc 4 than the side surface of the radial flange 6a of the input hub 6 facing the friction plate.

As will be understood from the above description, according to the clutch brake assembly of the invention, only one side surface of the friction plate 9 takes part in performing two actions, i.e., clutch action and brake action, which does not only permit reduction in the axial lengths of the individual component parts of the assembly but also permits large reduction in the total axial length of the assembly. Further, the assembly is comprised of a minimum of component parts and can therefore be operated with high reliability and much facility.

Figure 5:
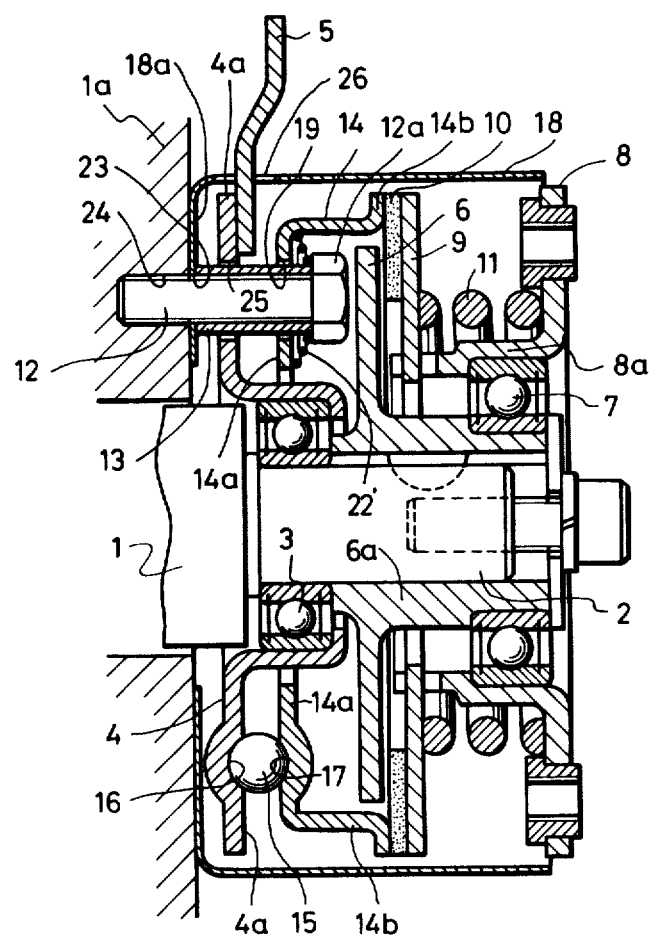
FIG. 5 is a longitudinal vertical sectional side view showing a clutch brake assembly according to anoter embodiment of the invention.

FIG. 5 illustrates a clutch brake assembly according to another embodiment of the invention, wherein parts corresponding to those in FIGS. 1 through 4 are designated by like reference numerals. The assembly according to this embodiment is designed with a smaller radial length than the assembly according to the aforedescribed embodiment shown in FIG. 1. The brake element 14 is formed of a hollow cylindrical member having a radially inwardly extending flange 14a formed at its rear end and a radially outwardly extending flange 14b formed at its front end. The bolts 12 and the sleeves 13 fitted thereon extend through respective bores 19 formed in the inwardly extending flange 14a to prohibit circumferential displacement of the brake element 14 while permitting axial movement of the same element.

The operating element 4 is formed of a cylindrical member having a radially outwardly extending flange 4a. The flange 14a of the brake element 14 are arranged in facing relation to the flange 4a of the operating element 4. The flange 4a of the operating element 4 is formed with a plurality of elongate bores 25 extending circumferentially of the flange 4a, through which bores the bolts 12 and the sleeves 13 fitted thereon extend. The bores 25 each have such a circumferential length as permits pivoting of the operating element 4 to its clockwise and counterclockwise extreme positions. The flange 4a of the operating element 4 is also formed with a plurality of grooves 16 which are arranged at circumferentially equal intervals. The above-mentioned bores 25, through which the bolts 12 and the sleeves 13 extend, are arranged between adjacent ones of the grooves 16 at circumferentially equal intervals.

A spring 22', which is similar to the spring 22 shown in FIG. 1, is provided between the head 12a of each bolt 12 and the inwardly extending flange 14a of the brake element 14 to permanently urge the brake element 14 toward the operating element 4 via the clutch balls 15.

The arrangement of the other parts and the operation of the assembly according to this embodiment are similar to those of the embodiment shown in FIGS. 1 through 4, description of which is therefore omitted.

According to the embodiment of the arrangement described above and shown in FIG. 5, a plurality of bolts 12 supporting the brake element 14 can be arranged to extend through the operating element 4, at circumferentially equal intervals between adjacent grooves 16 formed in the operating element 4 at circumferentially equal intervals, to thereby make it possible to largely reduce the outer diameter of the whole clutch brake assembly in addition to large reduction in the axial length of the same assembly.

While the invention has been described with respect to preferred embodiments, it is to be understood that various changes and modifications may be made in the invention without departing from the spirit and scope thereof.

What is claimed is:

1. A clutch brake assembly comprising:
   an annular operating element externally operable for rotational movement through a predetermined circumferential angle;
   a cylindrical input hub arranged concentrically of said operating element and rigidly fitted on an output shaft of a rotary machine as a driver;
   an output hub having an axially extending boss portion and arranged concentrically of said output shaft for rotation relative to said output shaft;
   an annular friction plate splinefitted on said boss portion of said output hub for rotational movement together with said output hub and for axial displacement relative to said output hub for frictional engagement with said input hub;
   urging means resiliently urging said friction plate toward said input hub;
   an annular brake element interposed between said operating element and said friction plate for axial displacement into frictional engagement with said friction plate;
   mounting means for said brake element for permitting axial displacement of said brake element and prohibiting circumferential displacement of said brake element,
   said mounting means including a plurality of bolts held stationary and arranged at circumferentially spaced locations of said brake element and disposed axially of the clutch brake assembly; and a plurality of sleeves each fitted on an associated one of said bolts, said brake element being fitted on said sleeves for axial displacement along said sleeves; and
   a plurality of balls rollingly held between said operating element and said brake element;
   said operating element including a plurality of first grooves formed in a side surface thereof facing said brake element at circumferentially spaced locations, said brake element including a plurality of second grooves formed in a side surface thereof facing said operating element at circumferentially spaced locations, said first and second grooves extending circumferentially, respectively, of said operating element and said brake element, at least one of said first and second grooves each having a depth gradually decreasing from one end thereof toward the other end thereof, said balls each being engaged in mutually facing ones of said first and second grooves, whereby axial displacement of said brake element in a direction toward said operating element causes frictional engagement of said input hub with said friction plate to thereby permit transmission of torque from said input hub to said output hub, and axial displacement of said brake element in a direction away from said operating element causes disengagement of said friction plate from said input hub to thereby interrupt said torque transmission and simultaneously causes frictional engagement of said brake element with said friction plate to thereby cause braking of said output hub;
   said annular brake element comprising an annular plate having opposed side surfaces, one side surface of said annular plate being disposed for frictional engagement with said friction plate and the other side surface of said annular plate being disposed in facing relation to said operating element via said balls interposed therebetween.

2. A clutch brake assembly comprising:
   an annular operating element externally operable for rotational movement through a predetermined circumferential angle;
   a cylindrical input hub arranged concentrically of said operating element and rigidly fitted on an output shaft of a rotary machine as a driver;
   an output hub having an axially extending boss portion and arranged concentrically of said output shaft for rotation relative to said output shaft;

an annular friction plate splinefitted on said boss portion of said output hub for rotational movement together with said output hub and for axial displacement relative to said output hub for frictional engagement with said input hub;

urging means resiliently urging said friction plate toward said input hub;

an annular brake element interposed between said operating element and said friction plate for axial displacement into frictional engagement with said friction plate;

mounting means for said brake element for permitting axial displacement of said brake element and prohibiting circumferential displacement of said brake element, said mounting means including a plurality of bolts held stationary and arranged at circumferentially spaced locations of said brake element and disposed axially of the clutch brake assembly; and a plurality of sleeves each fitted on an associated one of said bolts, said brake element being fitted on said sleeves for axial displacement along said sleeves; and a plurality of balls rollingly held between said operating element and said brake element;

said operating element including a plurality of first grooves formed in a side surface thereof facing said brake element at circumferentially spaced locations, said brake element including a plurality of second grooves formed in a side surface thereof facing said operating element at circumferentially spaced locations, said first and second grooves extending circumferentiahly, respectively, of said operating element and said brake element, at least one of said first and second grooves each having a depth gradually decreasing from one end thereof toward the other end thereof, said balls each being engaged in mutually facing ones of said first and second grooves, whereby axial displacement of said brake element in a direction toward said operating element causes frictional engagement of said input hub with said friction plate to thereby permit transmission of torque from said input hub to said output hub, and axial displacement of said brake element in a direction away from said operating element causes disengagement of said friction plate from said input hub to thereby interrupt said torque transmission and simultaneously caused frictional engagement of said brake element with said friction plate to thereby cause braking of said output hub;

said annular brake element comprising a cylindrical member having two ends, said cylindrical member having a first flange radially outwardly extending from an end thereof and a second flange radially inwardly extending from the other end thereof, said first flange being disposed for frictional engagement with said friction plate and said second flange being disposed in facing relation to said operating element via said balls interposed therebetween.

3. The clutch brake assembly as claimed in claim 1 or 2, wherein said first and second grooves each have a depth gradually decreasing from one end thereof toward the other end thereof, the direction in which the depth of each of said first grooves decreases being opposite to the direction in which the depth of associated one of said second grooves decreases.

4. The clutch brake assembly as claimed in claim 2, wherein said first grooves are formed in said operating element at circumferentially equal intervals, said bolts and sleeves being arranged between adjacent ones of said first grooves at circumferentially equal intervals.

5. The clutch brake assembly as claimed in claim 1 or 2, wherein said input hub has a radially outwardly extending flange, said flange being interposed between said operating element and said friction plate.

6. The clutch brake assembly as claimed in claim 1 or 2, wherein at least one of said first and second grooves has a depth gradually decreasing from one end thereof toward the other end thereof, said at least one groove having a width gradually decreasing from one end thereof toward said other end thereof.

7. The clutch brake assembly as claimed in claim 3, wherein said input hub has a radially outwardly extending flange, said flange being interposed between said operating element and said friction plate.

* * * * *